United States Patent
Voznick et al.

[19]

[11] Patent Number: 5,939,155
[45] Date of Patent: Aug. 17, 1999

[54] CAR CAP

[76] Inventors: Michael J. Voznick; Sandra Henson, both of 1718 Harbor Landing, Roswell, Ga. 30076

[21] Appl. No.: 08/516,338

[22] Filed: Aug. 17, 1995

[51] Int. Cl.[6] .................................................. B60R 13/00
[52] U.S. Cl. .................................. 428/31; 2/425; 40/592; 428/900
[58] Field of Search ........................ 428/31, 40.1; 362/74, 362/170, 490, 493; 2/425; 40/592

[56] References Cited

U.S. PATENT DOCUMENTS

| | | | |
|---|---|---|---|
| D. 327,506 | 6/1992 | Bartholemai et al. | D20/10 |
| D. 349,763 | 8/1994 | Cromer | D23/371 |
| 2,975,538 | 3/1961 | Murfin | 428/31 X |
| 3,440,748 | 4/1969 | Hackley | 40/129 |
| 3,910,540 | 10/1975 | Kayler | 428/31 X |
| 4,357,595 | 11/1982 | Gosswiller | 362/170 X |
| 4,972,795 | 11/1990 | Mace | 428/31 X |
| 5,126,887 | 6/1992 | Sparfke | 359/894 |
| 5,345,614 | 9/1994 | Tanaka | 2/425 |
| 5,549,939 | 8/1996 | Ray | 428/31 |
| 5,549,940 | 8/1996 | Noone | 428/31 |

*Primary Examiner*—Henry F. Epstein

[57] ABSTRACT

A car cap including a magnetic base and a cap body attached to the magnetic base, the cap body having a cap bill having a cap bill aerodynamic taper.

5 Claims, 3 Drawing Sheets

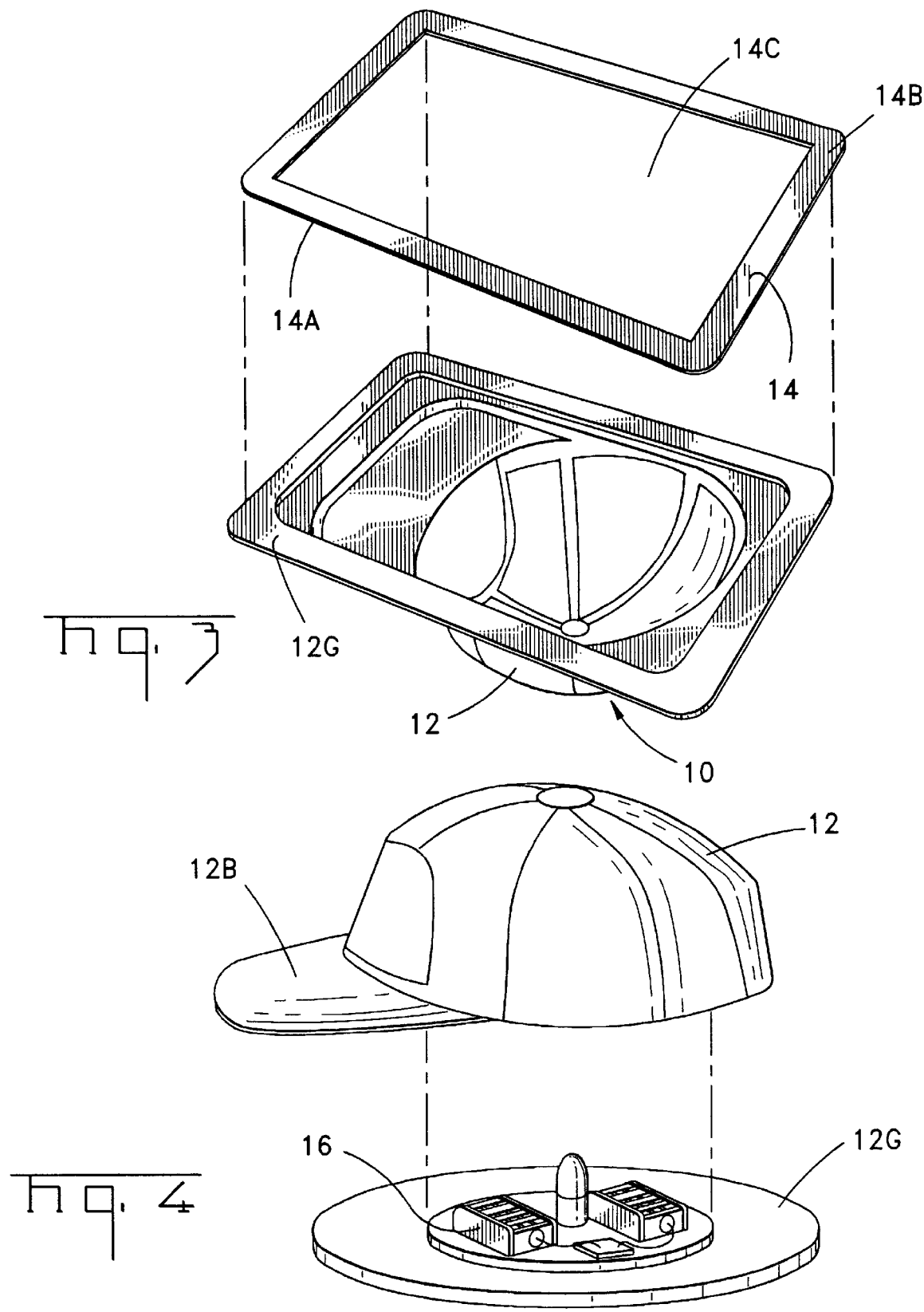

CAR CAP

FIELD OF THE INVENTION

The present invention relates to a car cap. More particularly, the present invention relates to a decorative cap that can be placed on the roof of a vehicle.

BACKGROUND OF THE INVENTION

Numerous innovations for a vehicle roof ornament have been provided in the prior art that are described as follows. Even though these innovations may be suitable for the specific individual purposes to which they address, they differ from the present invention as hereinafter contrasted.

U.S. Pat. No. 349,763 to Dean Cromer discloses an ornamental design for a roof mounted smoke exhaust for use in removing cigarette smoke from the interior of an automobile. The patented invention is an ornamental design while the present invention is a utility invention. Moreover, the present invention performs a different function from the patented invention.

U.S. Pat. No. 327,506 to G. Bartholomai et al. discloses an automobile roof sign. The patented invention is an ornamental design while the present invention is a utility invention.

U.S. Pat. No. 3,440,798 to J. C. Hackley discloses a magnetic roof top sign for cars. The patented invention is a detachable magnetic rooftop sign for automotive vehicles and the like and in particular to an improved construction which is highly stable and resistant to displacement by wind during use. The patented invention utilizes different elements from the present invention.

U.S. Pat. No. 5,126,887 to Uwe Sprafke discloses a cap for protecting the ocular of a periscope on a combat vehicle. A wrapping encloses expanded plastic and leaves a viewing cutout uncovered. Controls and/or electrical equipment are integrated into the wrapping in order to save space inside the vehicle. The patented invention utilizes different elements from the present invention. The present invention performs a different function from the patented invention and does not lend itself for use on a combat vehicle.

U.S. Pat. No. 5,345,614 to H. Tanaka discloses a vehicle helmet that includes a cap body comprised of a shell and shock absorbing liner fitted to an inner surface of the shell, and a longitudinally extending air duct which is provided in a wall of the cap body. The inside of the cap body can be ventilated through the air duct, wherein at least a portion of the shock absorbing liner is divided into an outer layer on the side of the shell, and an inner liner superimposed on an inner surface of the outer layer, the inner and outer layers having recessed grooves provided in opposed surfaces thereof to define an air duct, the inner layer having a vent hole. Thus, air-stream flowing into the air duct can flow at a high rate without any leakage, thereby reliably performing a ventilation of the inside of the cap body. The patented invention utilizes different elements from the present invention and performs a different function from the present invention.

Numerous innovations for vehicle roof ornaments have been provided in the prior art that are adapted to be used. Even though these innovations may be suitable for the specific individual purposes to which they address, they would not be suitable for the purposes of the present invention as heretofore described.

SUMMARY OF THE INVENTION

The present invention discloses a car cap. The prior art does not show the present invention. A synergistic effect was produced utilizing the present invention due to the innovative combination of elements.

Accordingly, it is an object of the present invention to provide a car cap that allows the user to place a cap on the roof of their vehicle.

More particularly, it is an object of the present invention to provide a car cap that allows the user to display various types of decals and/or emblems on the car cap.

It is another object of the present invention to provide a car cap that allows users to proudly display their favorite sporting teams on the car cap.

It is another object of the present invention to provide a car cap that includes a magnetic base and a cap body attached to the magnetic base.

It is another object of the present invention to provide a car cap wherein the cap body includes a cap bill which includes a cap bill aerodynamic taper.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF DESCRIPTION OF THE DRAWINGS

FIG. 3 is an exploded bottom, side, back perspective view of the decorative car cap of this invention.

FIG. 4 is an exploded side, perspective view of the decorative car cap hereof showing a contained light source thereunder.

FIG. 5 is a side view of the decorative car cap hereof placed on a vehicle roof.

DETAILED DESCRIPTION OF THE PREFERRED EMBODIMENT

Figure 1:
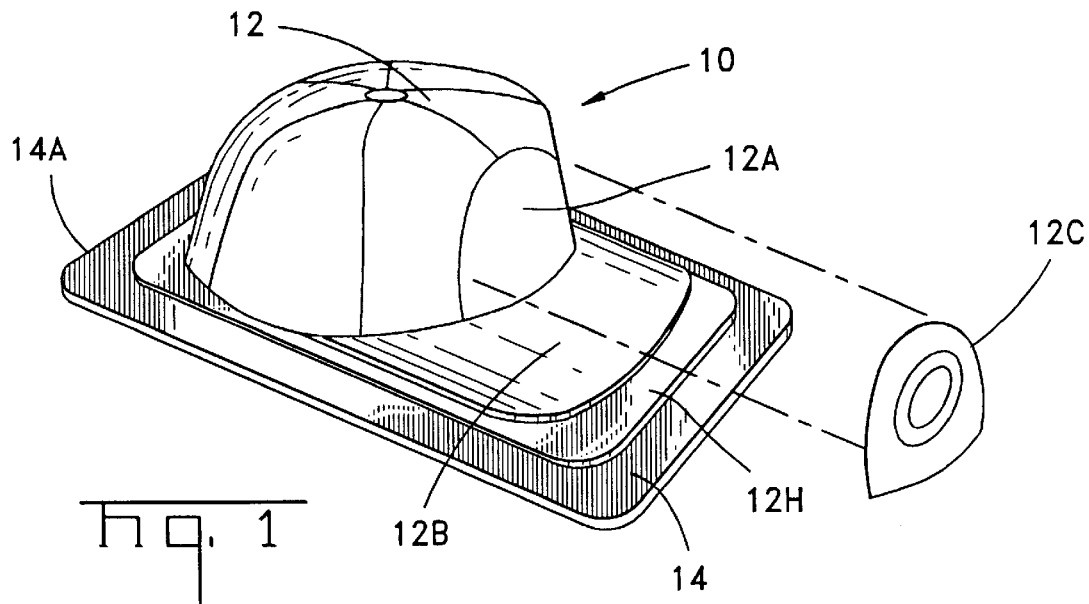
FIG. 1 is a top, front perspective view of the decorative car cap of this invention.
Figure 2:
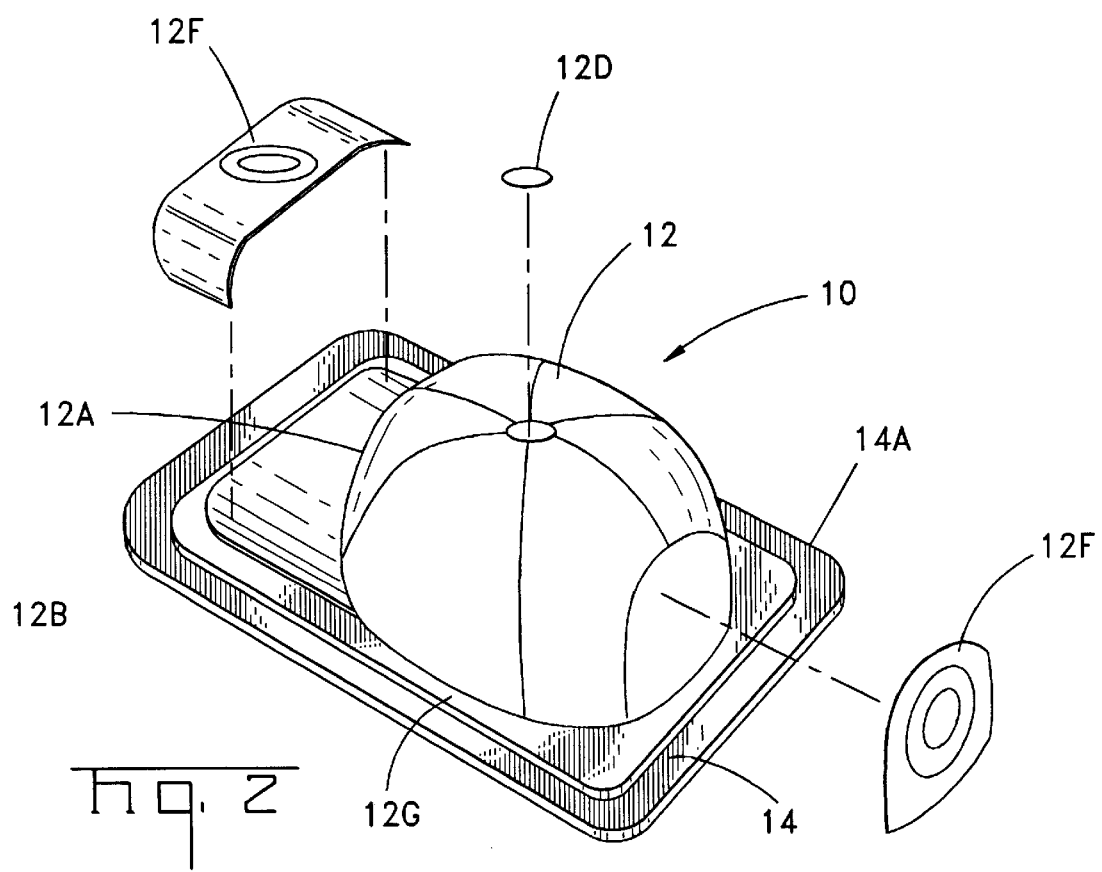
FIG. 2 is a top, rear perspective view of the decorative car cap of FIG. 1, showing a proposed visor decal exploded therefrom.
Figure 7:
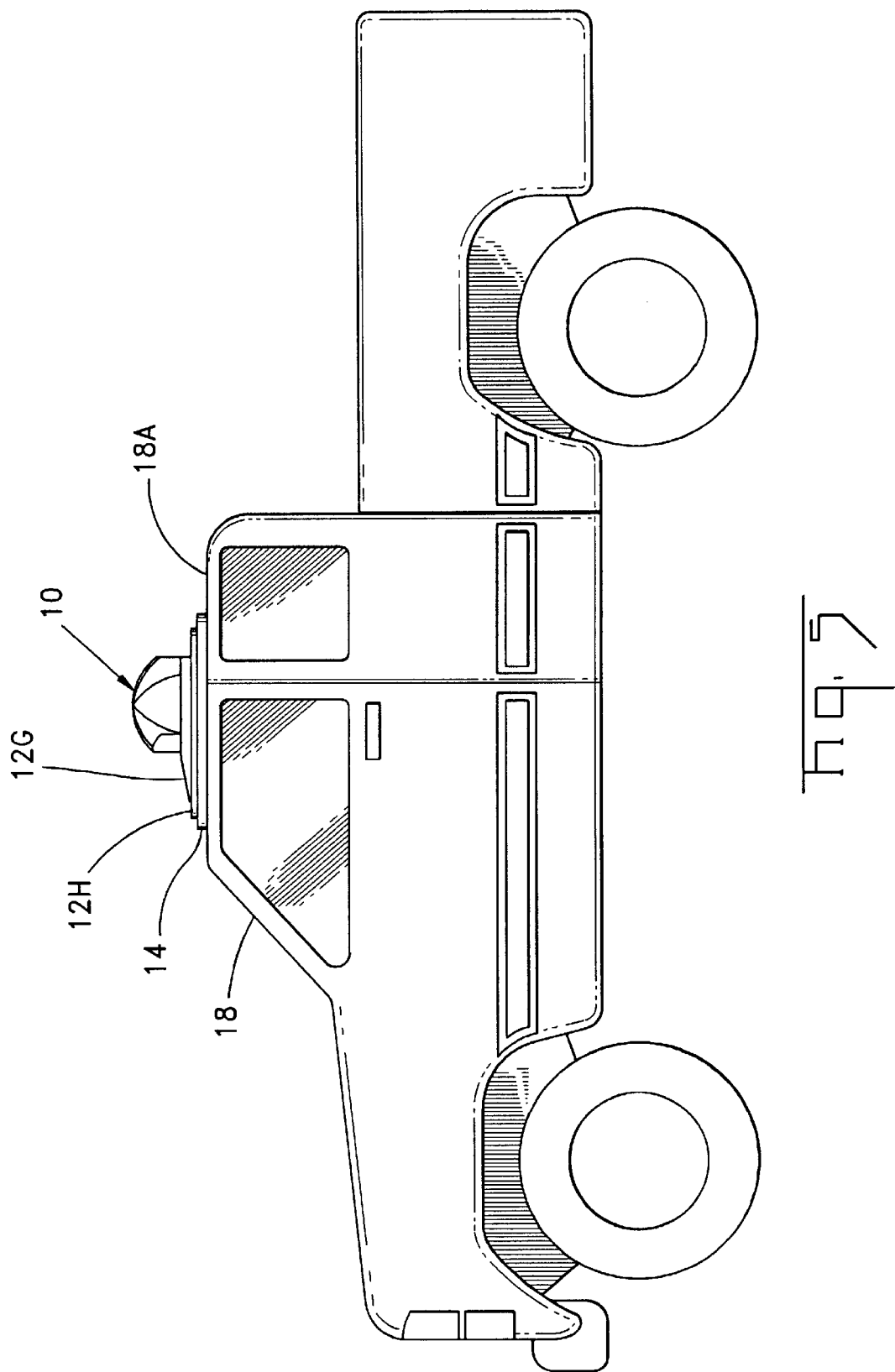

As shown in FIGS. 1, 2, 3, 4 & 5 the car cap 10 includes a magnetic base 14 and a cap body 12. The cap body 12 has a cap front 12A, a cap bill 12B, a cap front decal 12C, a cap top decal 12D, a cap back decal 12E, a cap bill decal 12F, and a cap base 12G. The cap front decal 12C, the cap top decal 12D, the cap back decal 12E, and the cap bill decal 12F can be attachable to the car cap 10. The cap bill 12B includes a cap bill aerodynamic taper 12H. The cap body 12 is attached to the magnetic base 14. As shown in FIG. 5 the car cap 10 can be placed on a vehicle roof 18A. The magnetic base 14 holds the car cap 10 firmly on the vehicle roof 18A while the cap bill aerodynamic taper 12H prevents wind shear and force from blowing the car cap 10 off the vehicle roof 18A.

The magnetic base 14 includes a magnetic base top 14A and a magnetic base bottom 14B. The cap body 12 can be attached to the magnetic base top 14A while the magnetic base bottom 14B can include a two sided adhesive 14C which provides additional support for the car cap 10. The cap bill aerodynamic taper 12H works in conjunction with the magnetic base 14 and the two sided adhesive 14C to keep the car cap in place on the vehicle roof 18A during vehicle movement.

As shown in FIG. 4 the car cap 10 can also include a light source 16 disposed within the cap body 12. The light source 16 can have the ability to emit constant light or flashing light.

The car cap 10 can be manufactured from the group of materials of plastic, epoxy, metal, metal alloys, carbon graphite, ceramic or syrene matte.

It will be understood that each of the elements described above, or two or more together, may also find a useful application in other types of constructions differing from the type described above.

While the invention has been illustrated and described as embodied in a car cap, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A vehicle roof decoration in the form of a cap having a generally hemi-spherical body portion and a visor extending from the front thereof, said roof decoration comprising
    a.) a first base of a first size, generally planar for mounting said cap, and
    b.) a second generally planar base of a second size larger than said first base, for removably mounting said first base to the roof of a vehicle, where said visor is curved, such that when mounted and facing forward of said vehicle is aerodynamically configured to assist in holding said roof decoration to said roof.

2. The vehicle roof decoration according to claim 1, wherein said second base is removably mounted to said roof by magnetic attraction to said roof.

3. The vehicle roof decoration according to claim 1, wherein said second base is removably mounted to said roof by a double-sided adhesive tape.

4. The vehicle roof decoration according to claim 1, including a battery operated light mounted on said first generally planar base and positioned thereon to underlie said generally hemi-spherical body portion.

5. The vehicle roof decoration according to claim 1, wherein said visor and said body portion include smooth surfaces for receiving ornamental decals thereon.

* * * * *